United States Patent [19]

Nichols et al.

[11] Patent Number: 4,557,838

[45] Date of Patent: Dec. 10, 1985

[54] INHIBITING ACID CORROSION OF METALS

[75] Inventors: James D. Nichols, Glenmoore; Richard Derby, Media; Glenn T. von dem Bussche, Wescosville; David A. Hannum, Chadds Ford, all of Pa.

[73] Assignee: Air Products and Chemicals, Inc., Allentown, Pa.

[21] Appl. No.: 653,993

[22] Filed: Sep. 24, 1984

Related U.S. Application Data

[63] Continuation-in-part of Ser. No. 366,640, Apr. 8, 1982, abandoned.

[51] Int. Cl.$^4$ ............................................. C23F 11/04
[52] U.S. Cl. .............................. 252/8.55 C; 252/148; 252/149; 252/390; 252/391; 422/12
[58] Field of Search .................... 252/8.55 C, 8.55 E, 252/8.55 D, 390, 391, 148, 149

[56] References Cited

U.S. PATENT DOCUMENTS

| | | | |
|---|---|---|---|
| 2,799,648 | 7/1957 | Nathan | 252/8.55 |
| 2,814,593 | 11/1957 | Beiswanger et al. | 252/8.55 |
| 3,107,221 | 10/1963 | Harrison et al. | 252/8.55 X |
| 3,188,292 | 6/1965 | Pirotte | 252/391 X |
| 3,249,548 | 5/1966 | Herman et al. | 252/8.55 X |
| 3,277,011 | 10/1966 | Chadwick et al. | 252/391 |
| 3,288,684 | 11/1966 | Eaton | 252/391 |
| 3,312,625 | 4/1967 | Peterson | 252/391 |
| 3,404,094 | 10/1968 | Keeney | 252/8.55 |
| 3,412,024 | 11/1968 | Stanford | 252/8.55 |
| 3,634,270 | 1/1972 | Engle et al. | 252/149 |
| 4,028,268 | 6/1977 | Sullivan et al. | 252/392 |

*Primary Examiner*—Herbert B. Guynn
*Attorney, Agent, or Firm*—Michael Leach; James C. Simmons; E. Eugene Innis

[57] ABSTRACT

Metal corrosion by aqueous acid solutions is inhibited by admixture therein of a synergistic additive consisting essentially of:

(1) a heterocyclic nitrogen compound or alkylamine,
(2) an acetylenic alcohol, and
(3) a dialkylthiourea.

In certain instances good inhibition against metal corrosion is obtained without the inclusion of the dialkylthiourea in the additive composition.

20 Claims, No Drawings

INHIBITING ACID CORROSION OF METALS

CROSS-REFERENCE TO RELATED APPLICATIONS

This application is a continuation-in-part of application Ser. No. 366,640, filed Apr. 8, 1982, now abandoned.

TECHNICAL FIELD

The present invention is concerned with compositions and methods for reducing corrosion of metal surfaces by aqueous acid solutions.

BACKGROUND OF THE PRIOR ART

In many technical and industrial operations strong aqueous acid solutions are employed. In such operations, these acid solutions come in contact with metal surfaces which are thus subjected to corrosive attack by the acids. The problem is particularly prevalent in oil drilling operations, wherein with decreasing oil reserves it becomes necessary to drill deeper and deeper wells to obtain desired oil recovery. A common practice employed for enhancing drilling through sandstone and other rock formations, is to pump an aqueous acid solution down the well shaft through the rock formation to dissolve mineral constituents. Aqueous hydrochloric acid of about 15% concentration has been used for this purpose, but such acid is much too corrosive to be permitted to come in contact with carbon steel pipe and various chemicals have been added to the acid solutions to reduce their rate of attack on metals. Among the types of compounds found suitable to inhibit corrosion of metals by hydrochloric acid are aliphatic and cyclic amines, and certain unsaturated alcohols.

As deeper wells are drilled, with increasing temperatures thereby encountered, the rate of corrosion of the steel pipe is increased. To overcome this increased corrosion of the steel by aqueous hydrochloric acid solutions other acids have been used to replace all or part of the hydrochloric acid, such as formic acid. But as still deeper wells are required to be drilled even the reduced corrosive power of formic acid increases to such an extent that the value of the recovered petroleum does not compensate for increased loss of pipe due to corrosion.

Formic acid alone, although not as strong as hydrochloric acid, is corrosive to carbon steel and, especially in compositions including both formic and hydrochloric acid, it is necessary to add certain chemicals to these acid compositions to inhibit or reduce the rate of metal corrosion thereby. Many of the chemical additives which are effective in reducing metal corrosion by hydrochloric acid have also been found effective as corrosion inhibitors in formic acid solutions or mixtures of hydrochloric and formic acid. On the other hand, some of the most effective additives for reducing the corrosion of metals by hydrochloric acid, surprisingly, were found to be less effective as inhibitors in aqueous acid solutions containing formic acid in addition to hydrochloric acid.

In addition to well drilling, there are industrial operations in which strong aqueous acid solutions are employed in contact with metals subject to corrosive attack, including the field of metal fabrication where it is common practice to utilize such acid solutions in metal cleaning or pickling, for example, to remove surface oxide coatings prior to further processing, and in general for protection of storage tanks and pipelines against acid corrosion.

The patent and technical literature discloses numerous multicomponent formulations for inhibiting attack of ferrous or other heavy metals by corrosive acids. Such formulations include one or more components such as acetylenic alcohols, quaternary derivatives of heterocyclic nitrogen bases, halomethylated aromatic compounds, formamides and the like.

U.S. Pat. No. 3,634,270 proposes as a corrosion inhibitor a composition comprising (1) the reaction product of a selected amino compound with a ketone, an aldehyde and formic acid in ethylene glycol; in admixture with a (2) surface active agent such as an alkylphenoxy polyethoxy ethanol; and (3) a sulfur compound which may be a thiourea, thiocyanate or thiazole; and which composition may further include (4) an acetylenic alcohol.

In U.S. Pat. No. 4,028,268 multicomponent inhibitor compositions are described to be effective in protection of oil field tubular goods against attack by hydrochloric acid or other corrosive acids at elevated temperatures. The disclosed compositions comprise at least four specifically selected components:

(1) quaternary derivatives of quinoline (or other similar heterocyclic nitrogen bases) and a halomethylated polynuclear aromatic compound (e.g. polystyrene);
(2) an acetylenic aliphatic alcohol;
(3) a nonionic surface active agent, preferably an ethylene oxide adduct of a primary amine; which may be supplemented with a lauryl alcohol derivative of ethylene oxide; and
(4) an ester or amide derivative of formic acid.

BRIEF SUMMARY OF THE INVENTION

It has now been found, in experiments leading to the present invention, that when an acetylenic alcohol is admixed with certain amines hereinafter described, a synergistic corrosion inhibiting capability is exhibited, particularly in aqueous acidic compositions of relatively high hydrochloric acid concentration. A blend of the acetylenic alcohol with an alkylthiourea displayed corrosion inhibiting results comparable to that of the alkylthiourea alone, at the same concentration of total additive, over the acid range tested. On the other hand, it was found that a ternary mixture of the acetylenic alcohol, these amines and alkyl thiourea, exhibited a universal corrosion inhibiting ability which in most cases was at least equal to and often superior to the binary mixtures of any two of these. The described ternary mixtures displayed a synergistic corrosion inhibiting effect instead of that predicted from a linear combination of these components.

DETAILED DESCRIPTION OF THE INVENTION

The preferred inhibitor compositions in accordance with the present invention essentially consist of (1) a certain amine or amine mixture as hereinafter described, (2) an acetylenic alcohol having preferably 3 to 10 carbon atoms, and (3) a dialkyl thiourea in a weight amount less than that of the amines and less than that of the acetylenic alcohol, for example, in the range of 0.02 to 0.5 times the weight of the amines and of the acetylenic alcohol, especially 0.05 to 0.15 times the weight. Effective inhibition of attack of ferrous metal by aqueous acid comprising formic acid or admixtures of formic and hydrochloric acid is obtained when the inhibitor mixtures of the invention are employed at a dosage in the range of at least 0.05% by weight of the aqueous acid solution when such acid solution contains chiefly formic acid, and at a dosage of at least 0.10% by weight of the aqueous acid solution when the principal acid component is a strong mineral acid such as hydrochloric acid. Accordingly, suitable amounts of the corrosion inhibitor mixtures of the invention, both binary and tertiary, range from 0.05 to 2%, preferably to 1%, by weight of the acid solution.

Among the amines or mixtures of amines that may be effectively employed in the inhibitor compositions according to the invention are the nitrogen-containing corrosion inhibitors well known in the art including heterocyclic nitrogen compounds such as substituted and unsubstituted imidazolines, piperazines, pyridines, and piperidines including 1,2-dialkyl($C_2$–$C_{20}$)imidazolines, 1-hydroxyethyl-2-alkyl($C_2$–$C_{20}$)imidazolines and N-(2-aminoethyl)piperazine; secondary and tertiary aliphatic amines containing at least four, preferably to about thirty, carbon atoms, examples of which include: dimethyldodecylamine, triethylenetetramine, dicyclohexylamine, tridecylamines, tallowamines, oleylamines, cocoamines and alkyl($C_2$–$C_{20}$)dimethylamines. Particular preference is had for amine-containing corrosion inhibitor mixtures obtained as by-products in the manufacture of linear or cyclic saturated amines, such as (A) the by-product mixture obtained in the production of ethylamine by the catalytic reaction of ammonia with ethanol, (B) the by-product mixture obtained in the production of isopropylamine by reaction of ammonia with isopropyl alcohol and/or isopropyl chloride and (C) the by-product comprised in the heavy crude amine distillate separated from the manufacture of triethylenediamine(diazabicyclo octane) by the catalytic condensation reaction of 4-(2-aminoethyl)piperazine or 4-(2-hydroxyethyl)piperazine.

By-product A is available commercially under the designation "ANCOR 300" from Air Products and Chemicals, Inc. and comprises chiefly about 30% or more of alkylpyridines and alkylpiperidines together with about 5% or more alkylamines and up to about 15% ethanol.

By-product B is available commercially under the designation "ANCOR 301" from Air Products and Chemicals, Inc. and comprises chiefly over 50% of mono-, di- and trialkylamines, the last named predominating.

By-product C is available commercially under the designation "ANCOR 202" from Air Products and Chemicals, Inc. and comprises chiefly about 50% of hydroxyethyl and aminoethylpiperazines together with mostly unsubstituted and alkyl substituted piperazines.

The acetylenic alcohol employed is preferably one having 3 to 10 carbon atoms, especially 6 to 10 carbon atoms, in the chain with the triple bond preferably at the end of the carbon chain; an example of which is 4-ethyl-1-octyn-3-ol (ethyl octynol), hereinafter designated EO. Other effective acetylenic alcohols that many be employed include: 1-hexyn-3-ol (hexynol), decynediol and propargyl alcohol.

In the binary and ternary compositions of the invention the weight ratio of the amine corrosion inhibitor component to the acetylenic alcohol component preferably ranges from 5:1 to 1:5, especially 1.5:1 to 1:1.5.

The preferred thiourea compounds are the symmetrical dialkyl substituted compounds, of which the most preferred example is 1,3-di-n-butylthiourea (DBTU). The other di-alkyl substituted thiourea compounds include: 1,3-diethyl-, 1,3-dipropyl-, 1,3-dihexyl-, and 1,3-di-2-ethyl hexyl thiourea.

Experimental runs were made to test the corrosion inhibiting properties of individual inhibitor compounds and certain binary and ternary mixtures of these, using respectively 15% formic acid and blends of 15% formic/15% hydrochloric acid in 3:1, 1:1 and 1:3 weight ratios, applied to 1010 steel coupon specimens at an exposure time of 16 hours at 88° C. The measured corrosion rate is the determined weight loss of metal extrapolated to a basis of a 24 hour day exposure and per square foot of surface area. Each of the acid solutions tested with a single added inhibitor (thiourea compound, mixed amines, or acetylenic alcohol) showed a decreased rate of corrosion as compared to the acid without added inhibitor. All of the tested inhibitors exhibited increased corrosion resistivity with increased formic acid concentrations in the formic/HCl blend, except in the case of the acetylenic alcohol (EO) where the reverse is true.

Tests were carried out on binary systems including (1) a mixture of complex amine by-product with EO, (2) complex amine by-product with DBTU, and (3) a mixture of EO and DBTU. It was found that the complex amine mixture with DBTU exhibited expected corrosion inhibiting abilities consistent with their individual additive properties. When EO was admixed with the complex amine by-product, however, a synergistic corrosion inhibiting capability was noted at high hydrochloric acid concentrations. On the other hand, a blend of EO/DBTU, over the acid range tested, yielded results comparable to DBTU used alone. No single or binary mixture of inhibitors was found to be universally useful in the varied acid systems presenting problems of metal corrosion.

It was found, however, that by the addition of EO and DBTU to the by-product amine mixtures to form a ternary system, the obtained system showed lower corrosion rates than expected, evidencing a synergistic effect that could not be predicted from the linear combination of these components. In a few instances some binary mixtures provided as good or slightly better corrosion resistance over a certain limited range of acid composition but the ternary mixtures exhibited a universal corrosion inhibiting ability which in most cases was superior or at least equal to other inhibitor blends.

EXAMPLES

Results obtained in tests made in corrosion of steel specimens by formic acid and by mixtures of formic acid with hydrochloric acid are reported in Tables 1 to 3 at various inhibitor dosages (wt% inhibitor in aqueous acid solution).

TABLE 1

TEST CONDITIONS

Acid: 15% Formic; 15% Formic/15% HCl
Temperature: 190° F. (88° C.)
Test Specimen: 1010 Steel
Specimen Exposure: 16 Hrs.

| Inhibitor | Weight Ratio | Corrosion Rate (lbs/ft²/day) | | | |
|---|---|---|---|---|---|
| | | 15% Formic Acid | 15% Formic Acid/15% HCl | | |
| | | | 3:1 | 1:1 | 1.3 |
| INHIBITOR DOSAGE: 0.4% | | | | | |
| Ancor 300 | — | 0.0354 | 0.1725 | 0.9612 | 1.629 |
| Ancor 301 | — | 0.1441 | 0.5260 | 1.2460 | 1.7148 |
| Ancor 202 | — | 0.0210 | 0.1873 | 0.4480 | 0.9804 |
| Blank | — | 0.2620 | 0.8560 | 1.3819 | 1.7877 |
| EO | — | 0.1245 | 0.0786 | 0.0578 | 0.0335 |
| A-300/EO | 1:1 | 0.0823 | 0.0275 | 0.0068 | 0.0069 |
| A-301/EO | 1:1 | 0.0851 | 0.0576 | 0.0115 | 0.0141 |
| A-202/EO | 1:1 | 0.0879 | 0.0082 | 0.0076 | 0.0066 |
| A-202/DBTU | 1:1 | 0.0030 | 0.0400 | 0.0769 | 0.2287 |
| DBTU | — | 0.0057 | 0.0388 | 0.0718 | 0.1025 |
| A-202/EO/DBTU | 1:1:0.5 | 0.0029 | 0.0300 | 0.0445 | 0.0600 |
| A-202/EO/DBTU | 1:1:0.25 | 0.0023 | 0.0204 | 0.0317 | 0.0404 |
| A-202/EO/DBTU | 1:1:0.125 | 0.0018 | 0.0149 | 0.0266 | 0.0336 |
| A-202/EO/DBTU | 1:1:0.0625 | 0.0019 | 0.0103 | 0.0206 | 0.0267 |
| A-202/EO/DBTU | 1:0.5:0.25 | 0.0019 | 0.0230 | 0.0391 | 0.0480 |
| A-202/EO/DBTU | 1:0.5:0.25 | 0.0017 | 0.0158 | 0.0276 | 0.0342 |
| INHIBITOR DOSAGE: 0.05% | | | | | |
| A-300/EO/DBTU | 1:1:0.125 | 0.0046 | 0.8243 | 1.3156 | 1.7500 |
| A-300/EO/DBTU | 1:1:0.0625 | 0.0094 | 0.3108 | 1.2926 | 1.7323 |
| A-301/EO/DBTU | 1:1:0.125 | 0.0106 | 0.4039 | 1.3908 | 1.7093 |
| A-301/EO/DBTU | 1:1:0.0625 | 0.0257 | 0.7424 | 1.3992 | 1.6124 |
| INHIBITOR DOSAGE: 0.10% | | | | | |
| A-300/EO/DBTU | 1:1:0.125 | 0.0038 | 0.0081 | 0.2332 | 1.6293 |
| A-300/EO/DBTU | 1:1:0.0625 | 0.0064 | 0.0090 | 0.8623 | 1.6287 |
| A-301/EO/DBTU | 1:1:0.125 | 0.0037 | 0.0076 | 0.8052 | 1.6980 |
| A-301/EO/DBTU | 1:1:0.0625 | 0.0068 | 0.0083 | 0.5373 | 1.6931 |
| INHIBITOR DOSAGE: 0.20% | | | | | |
| A-300/EO/DBTU | 1:1:0.125 | 0.0025 | 0.0101 | 0.0557 | 0.4101 |
| A-300/EO/DBTU | 1:1:0.0625 | 0.0102 | 0.0105 | 0.0301 | 0.3996 |
| A-301/EO/DBTU | 1:1:0.125 | 0.0030 | 0.0103 | 0.1190 | 0.9143 |
| A-301/EO/DBTU | 1:1:0.0625 | 0.0102 | 0.0105 | 0.0207 | 0.8502 |

TABLE 2

TEST CONDITIONS

Acid: 15% Formic; 15% Formic/15% HCl
Temperature: 190° F. (88° C.)
Test Specimen: 1010 Steel
Specimen Exposure: 16 Hrs.

| Inhibitor | Weight Ratio | Corrosion Rate (lbs/ft²/day) | | | |
|---|---|---|---|---|---|
| | | 15% Formic Acid | 15% Formic Acid/15% HCl | | |
| | | | 3:1 | 1:1 | 1.3 |
| INHIBITOR DOSAGE: 0.4% | | | | | |
| A-300/EO/DBTU | 1:1:0.125 | 0.0022 | 0.0090 | 0.0168 | 0.0198 |
| A-300/EO/DBTU | 1:1:0.0625 | 0.0021 | 0.0046 | 0.0098 | 0.0131 |
| A-301/EO/DBTU | 1:1:0.125 | 0.0025 | 0.0111 | 0.0187 | 0.0212 |
| A-301/EO/DBTU | 1:1:0.0625 | 0.0023 | 0.0045 | 0.0103 | 0.0135 |
| INHIBITOR DOSAGE: 0.3% | | | | | |
| A-300/EO/DBTU | 1:1:0.125 | 0.0021 | 0.0078 | 0.0139 | 0.0171 |
| A-300/EO/DBTU | 1:1:0.0625 | 0.0024 | 0.0041 | 0.0082 | 0.0113 |
| A-301/EO/DBTU | 1:1:0.125 | 0.0021 | 0.0079 | 0.0130 | 0.0166 |
| A-301/EO/DBTU | 1:1:1.0625 | 0.0023 | 0.0044 | 0.0090 | 0.0139 |
| IHHIBITOR DOSAGE: 0.2% | | | | | |
| A-300/EO/DBTU | 1:1:0.0625 | 0.0049 | 0.0074 | 0.0110 | 0.0160 |
| A-301/EO/DBTU | 1:1:0.0625 | 0.0034 | 0.0072 | 0.0107 | 0.0172 |
| INHIBITOR DOSAGE: 1.0% | | | | | |
| A-300/EO/DBTU | 1:1:0.125 | 0.0059 | 0.0257 | 0.0396 | 0.0411 |
| A-300/EO/DBTU | 1:1:0.0625 | 0.0033 | 0.0135 | 0.0191 | 0.023 |
| A-301/EO/DBTU | 1:1:0.125 | 0.0068 | 0.0251 | 0.0357 | 0.0443 |
| A-301/EO/DBTU | 1:1:0.0625 | 0.0035 | 0.0132 | 0.0219 | 0.026 |

TABLE 3

TEST CONDITIONS

Acid: 15% Formic; 15% Formic/15% HCl
Temperature: 190° F. (88° C.)
Test Specimen: 1010 Steel
Specimen Exposure: 16 Hrs.
INHIBITOR DOSAGE: 0.3%

| Inhibitor | Weight Ratio | Corrosion Rate (lbs/ft²/day) | | | |
|---|---|---|---|---|---|
| | | 15% Formic Acid | 15% Formic Acid/15% HCl | | |
| | | | 3:1 | 1:1 | 1.3 |
| A-300/OW-1/DBTU | 1:1:0.0625 | 0.0021 | 0.0068 | 0.0110 | 0.0158 |
| A-301/OW-1/DBTU | 1:1:0.0625 | 0.0026 | 0.0068 | 0.0108 | 0.0159 |
| A-300/A-202/EO/DBTU | 0.5:0.5:1:0.0625 | 0.0021 | 0.0071 | 0.0135 | 0.0179 |
| A-301/A-202/EO/DBTU | 0.5:0.5:1:0.0625 | 0.0024 | 0.0068 | 0.0132 | 0.0177 |

OW-1 is a registered trademark for a mixture of acetylenic alcohols marketed by Air Products and Chemicals, Inc.

A-300 in the tables stands for Ancor 300 amine mixture obtained as a by-product of ethylamine production. The principal components of Ancor 300 mixture are reported in Table 4 below. A-301 stands for Ancor 301 amine mixture obtained as a by-product of isopropylamine production. The principal components of Ancor 301 mixture are reported in Table 5 below. A-202 stands for Ancor 202 amine mixture obtained as by-product in the manufacture of triethylenediamine. The principal components of Ancor 202 mixture are reported in Table 6 below.

TABLE 4

ANCOR 300 AMINE MIXTURE

| Component | % by wt %. |
|---|---|
| ethanol | 14% |
| 1-amino-butane | 1% |
| butanenitrile | 1% |
| 1-butanol | 1% |
| 2-methyl-piperidine | 1% |
| 1-amino-hexane | 1% |
| 2-proline-ethylester | 1% |
| 3-methylpiperidine | 9% |
| 2-methyl-pyridine | 4% |
| di-butyl-amine | 5% |
| 1-amino-octane | 1% |
| 4-methyl-pyridine | 7% |
| 1-ethyl-2-methyl-piperidine | 3% |
| 2, 5, 3 or 4, trimethyl-piperidine | 1% |
| 1-(t-butyl)-(3 or 4)-methyl-piperidine | 1% |
| 3-ethyl-5-methyl-pyridine | 6% |
| 2-ethyl-3-methyl-pyridine | 1% |
| hexyl, butyl-amine | 1% |
| 4-propyl-pyridine | 1% |
| a substituted 2-methyl-piperidine | 1% |

Balance chiefly alkyl pyridines of about 85–180 Molecular Weight

TABLE 5

ANCOR 301 AMINE MIXTURE

| Component | % by wt %. |
|---|---|
| di-isopropylamine | 16% |
| 4-methyl-2-pentanone | 1% |
| cluster (7) probably 2-butanamine | 2% |
| 2-pentanol and cyclic alcohol or alkene | 1% |
| ethyl-di-isopropylamine | 1% |
| methyl-isopropyl-pentylamine | 34% |
| cluster (3) | 1% |
| 4-methyl-2-pentanol | 1% |
| C7 and C8 alcohols | 25% |
| isopropyl-2-hexylamine | 1% |
| cluster (4) possible imine molecular weight = 141 | 1% |
| C9 imine - molecular weight = 141 | 2% |

TABLE 5-continued

ANCOR 301 AMINE MIXTURE

| Component | % by wt %. |
|---|---|
| methyl-isopropyl-n-pentylamine | 1% |
| cis-2-(1,1-dimethyl-ethyl)-1-ethyl-3-methyl aziridine | 1% |
| C9 imine or cyclic amines | 1% |
| C10 alkylamine | 1% |
| C9 alkylamine | 2% |
| C12 alkylamine | 1% |
| C9 imine | 1% |
| C12 alkylamine (isopropyl-butyl-pentylamine) cluster (3) | 1% |
| C12 alkylamine | 1% |
| 2,5-dimethyl-1 H—pyrrole | 1% |
| 4-methoxy-n-methyl-benzen-amine | 1% |

TABLE 6

ANCOR 202 AMINE MIXTURE

| Component | % by wt %. |
|---|---|
| piperazine | 2.0 |
| methyl piperazine | 4.0 |
| 1-ethyl-4 methylpiperazine | 2.0 |
| 1-(2 hydroxyethyl)-4-methylpiperazine | 4.0 |
| N—(2-aminoethyl) piperazine | 50.0 |
| N—(2-hydroxyethyl) piperazine | 5.0 |
| substituted piperazines | |
| 1,4-dizazbicyclo[2.2.2]octane (TEDA) | 5.0 |
| Unknown nitrogen compounds | 27.0 |
| Water | 1.0 |

From the results shown in Tables 1 to 3, it is evident that the ternary mixtures of the invention provide a universal inhibitory effect against acid corrosion by formic acid as well as by mixtures of formic and hydrochloric acid, which is not obtained by any of the single components of the mixture. While the acetylenic alcohol (EO) displayed fairly good corrosion inhibiting properties with respect to acid mixtures of high hydrochloric acid content, it did not compare favorably with the ternary mixtures with respect to protection against metal corrosion by formic acid or mixtures of formic acid with up to about equal parts of hydrochloric acid.

It also appears from the data of Table 1 that while some protection against metal corrosion by formic acid and mixtures of formic acid with up to about equal amounts of hydrochloric acid is had by the ternary mixtures of the invention at dosages as low as 0.05% by weight of the aqueous acid composition, for practical purposes dosages of at least about 0.10% should preferably by utilized in the case of formic acid and at least about 0.2% in the case of acid mixtures having amounts of hydrochloric acid equal to or in excess of that of the formic acid.

In Table 3 some additional test results are tabulated employing as the acetylenic alcohol component of the ternary mixture OW-1 ® corrosion inhibitor, as well as several runs employing a by-product amine mixture predominating in alkyl piperazines (A-202) together with other by-product amine mixtures, respectively, (1) predominanting in alkyl piperidines and alkyl pyridines (A-303) and (2) in di- and trialkylamines (A-301). OW-1 corrosion inhibitor is a mixture of acetylenic alcohols comprising hexynol (60%), decynediol (22.5%) together with isopropyl ether (9%).

In the case of the amine by-product predominating in alkyl piperazines (A-202) used in the ternary composition of the invention, it was found that no significant difference was obtained by increasing the weight ratio of EO from 0.5 to 1.0. On the other hand, when the weight ratio of DBTU was decreased from 0.5 to 0.0625 in its A-202 ternary admixture with EO, increased corrosion resistance was had over the range of acid blends tested. This is an unexpected and significant result in that a high ratio of dialkylthiourea, the most expensive component, decreased the corrosion inhibiting performance in this system.

It should be noted that in the tests appearing in these tables the inhibitor dosage reported, say at 0.4% for the ternary mixture, corresponds to weight ratios of the components, as follows:

| at 0.4% dosage A-202/EO/DBTU | | | % by weight of aqueous acid | | |
|---|---|---|---|---|---|
| | | | A-202 | EO | DBTU |
| 1 | 1 | 0.5 | .16 | .16 | .08 |
| 1 | 1 | 0.25 | .18 | .18 | .04 |
| 1 | 1 | 0.125 | .188 | .188 | .024 |
| 1 | 1 | 0.0625 | .194 | .194 | .012 |

Thus a decrease in the quantity of the costly dialkylthiourea used in the inhibitor blend represents a significant savings in operating costs and an improvement in corrosion inhibition. From this standpoint the weight of the dialkyl thiourea in the inhibitor mixture may range from 0.02 to 0.5 times the weight of the amine corrosion inhibitor component and the acetylenic alcohol component, provided the weight of the thiourea component is less than both individually. The preferred ternary mixture is one having the complex amines/acetylenic alcohol and dialkylthiourea in the weight ratio (1:1:0.0625).

In Table 7 additional corrosion tests are reported at 0.2% inhibitor dosage for 15% formic acid and blends of 3:1 and 1:1 formic acid with hydrochloric acid, for various individual amine inhibitors and ternary mixtures of these with acetylenic alcohol and dialkylthiourea.

TABLE 7

ACIDIZING CORROSION TESTS CONDITIONS

Acid: 15% Formic; 15% Formic/15% HCl (3:1, 1:1)
Temperature: 190° F. (88° C.)
Coupon: 1010 Steel
Time: 16 Hrs.
Inhibitor Dosage: 0.2%

| | | Corrosion Rate (lbs/ft$^2$/day) | | |
|---|---|---|---|---|
| | | 15% Formic | Formic/HCl 3:1 | 1:1 |
| AEP | | 0.2823 | 0.6722 | 1.3135 |
| DMDA | | 0.0250 | 0.2421 | 0.5084 |
| TETA | | 0.2582 | 0.7569 | 1.3964 |
| 2-Picoline | | 0.3304 | 0.8874 | 1.5758 |
| Monazoline-O | | 0.0325 | 0.4223 | 1.3520 |
| Monazoline-CY | | 0.0499 | 0.9034 | 1.7185 |
| 2-Aminobenzimidazole | | 0.3419 | 0.1347 | 1.6503 |
| Dicyclohexylamine | | 0.2439 | 0.7223 | 1.4477 |
| Dibutylthiourea (DBTU) | | 0.0057 | 0.0511 | 0.1547 |
| EO/AEP/DBTU | 2:2:0.25 | 0.0025 | 0.0100 | 0.4203 |
| EO/TETA/DBTU | " | 0.0026 | 0.0104 | 0.3403 |
| EO/DMDA/DBTU | " | 0.0040 | 0.0423 | 0.2353 |
| EO/2-Picoline/DBTU | " | 0.0028 | 0.0133 | 0.6249 |
| EO/Monazoline-O/DBTU | " | 0.0032 | 0.01106 | 0.4783 |
| EO/Monazoline-CY/DBTU | " | 0.0026 | 0.0148 | 0.7852 |
| EO/2-Aminobenzimidazole/ DBTU | " | 0.0026 | 0.0107 | 0.4292 |
| EO/Dicyclohexylamine/ DBTU | " | 0.0025 | 0.0095 | 0.8889 |

AEP: N(2-aminoethyl)piperazine
DMDA: Dimethyldodecylamine
Monazoline-O: 1-(2-hydroxyethyl)-2-oldylimidazoline
Monazoline-CY: 1-(2-hydroxyethyl)-2-caprylimidazoline
DBTU: Dibutylthiourea
TETA: Triethylenetetraine

We claim:

1. A corrosion inhibitor composition consisting essentially of (a) at least one amine by-product mixture which is (1) that obtained in the production of ethylamine by the catalytic reaction of ammonia and ethanol and comprises an alkyl pyridine, an alkyl piperidine and an alkylamine, (2) that obtained in the production of isopropylamine by the reacton of ammonia with isopropyl alcohol or isopropyl chloride and comprises predominantly mono-, di- and trialkylamines, or (3) that obtained in the production of triethylenediamine by the catalytic condensation reaction of aminoethyl piperazine or hydroxyethyl piperazine and comprises N-hydroxyethyl and N-aminoethyl substituted piperazines and at least one alkyl piperazine, (b) an acetylenic alcohol having 6 to 10 carbon atoms, and (c) dibutyl thiourea, components (a) and (b) present in a weight ratio ranging from 5:1 to 1:5 and the weight amount of component (c) being less than the weight amount of component (a) and component (b) individually.

2. The composition of claim 1 in which component (c) is present in a ratio to component (a) or (b) in the range of 0.02 to 0.5.

3. The composition of claim 1 in which component (a) is a by-product obtained in the production of ethylamine by the catalytic reaction of ammonia with ethanol and comprises an alkyl pyridine, an alkyl piperidine and an alkylamine.

4. The composition of claim 1 in which component (a) is a by-product obtained in the production of isopropylamine by the reaction of ammonia with isopropyl alcohol or isopropyl chloride and comprises predominantly mono-, di- and trialkylamines.

5. The composition of claim 1 in which component (a) is a by-product obtained in the production of triethylenediamine by the catalytic condensation reaction of aminoethyl piperazine or hydroxyethyl piperazine and comprises predominantly N-hydroxyethyl and N-aminoethyl substituted piperazines and at least one alkyl piperazine.

6. The composition of claim 1 in which ethyl octynol is component (b) and components (a) and (b) are present in a weight ratio ranging from 1.5:1 to 1:1.5 with dibutyl thiourea ranging from 0.05 to 0.15 times the weight of component (a) or component (b).

7. The composition of claim 6 in which components (a) and (b) are present in about a 1:1 weight ratio.

8. The corrosion inhibitor composition of claim 1 in which component (a) and component (b) are present in a weight ratio ranging from 1.5:1 to 1:1.5.

9. A corrosion inhibited acid consisting essentially of an aqueous solution of at least one acid selected from the group consisting of formic acid and formic acid-hydrochloric acid mixtures and 0.05 to 2% of the inhibitor composition of claim 1.

10. The corrosion inhibited acid of claim 9 in which component (c) is in the range of 0.02 to 0.5 times the weight of component (a) or component (b).

11. The corrosion inhibited acid of claim 9 in which component (a) comprises an amine-containing by-product mixture obtained in the production of isopropylamine by the reaction of ammonia with isopropyl alcohol or isopropyl chloride and comprises predominantly mono-, di- and trialkylamines.

12. The corrosion inhibited acid of claim 9 in which component (a) comprises an amine-containing by-product mixture obtained in the production of ethylamine by the catalytic reaction of ammonia and ethanol and comprises an alkyl pyridine, an alkyl piperidine and an alkylamine.

13. The corrosion inhibited acid of claim 9 in which component (a) comprises an amine-containing by-product mixture obtained in the production of triethylene diamine by the catalytic condensation reaction of aminoethyl piperazine or hydroxyethyl piperazine and comprises N-aminoethyl and N-hydroxyethyl substituted piperazines and an alkyl piperazine.

14. The corrosion inhibited acid of claim 10 in which components (a) and (b) are present in a weight ratio of about 1:1.

15. An aqueous acid solution having reduced corrosion effect on ferrous metals, the aqueous solution consisting essentially of: formic acid and hydrochloric acid, together with about 0.05 to 2% of a corrosion-inhibiting additive by weight of the solution, the additive comprising ethyl octynol and an amine by-product mixture which is (a) that obtained in the production of ethylamine by the catalytic reaction of ammonia and ethanol and comprises an alkyl pyridine, an alkyl piperidine and an alkylamine, (b) that obtained in the production of isopropylamine by the reaction of ammonia with isopropyl alcohol or isopropyl chloride and comprises predominantly mono-, di- and trialkylamines, or (c) that obtained in the production of triethylenediamine by the catalytic condensation reaction of aminoethyl piperazine or hydroxyethyl piperazine and comprises N-hydroxyethyl and N-aminoethyl substituted piperazines and an alkyl piperazine in an ethyl octynol:amine by-product mixture weight ratio in the range of 5:1 to 1:5.

16. The aqueous acid solution of claim 15 in which the by-product mixture is that obtained in the production of ethylamine by the catalytic reaction of ammonia and ethanol and comprises an alkyl pyridine, an alkyl piperidine and an alkylamine.

17. The aqueous acid solution of claim 15 in which the by-product mixture is that obtained in the production of isopropylamine by the reaction of ammonia with isopropyl alcohol or isopropyl chloride and comprises predominantly mono-, di- and trialkylamines.

18. The aqueous acid solution of claim 15 in which the by-product mixture is that obtained in the production of triethylenediamine by the catalytic condensation reaction of aminoethyl piperazine or hydroxyethyl piperazine and comprises N-hydroxyethyl and N-aminoethyl substituted piperazines and an alkyl piperazine.

19. The aqueous acid solution of claim 15 in which the solution further contains dibutyl thiourea in a weight amount which is less than the weight amount of the ethyloctynol and the amine by-product mixture individually.

20. The aqueous acid solution of claim 15 in which the ethyl octynol:amine by-product mixture weight ratio ranges from 1.5:1 to 1:1.5.

* * * * *